United States Patent
Wolf (10) Patent No.: US 9,975,063 B2
(45) Date of Patent: May 22, 2018

(54) APPARATUS, SYSTEM, AND METHOD FOR SEPARATING OIL FROM A FLUID MIXTURE

(71) Applicant: National Oilwell Varco, L.P., Houston, TX (US)

(72) Inventor: Mark Ernest Wolf, Katy, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 110 days.

(21) Appl. No.: 15/224,271

(22) Filed: Jul. 29, 2016

(65) Prior Publication Data
US 2018/0028937 A1 Feb. 1, 2018

(51) Int. Cl.
*B01D 17/032* (2006.01)
*C02F 1/40* (2006.01)
*B01D 17/02* (2006.01)
*B01D 17/12* (2006.01)

(52) U.S. Cl.
CPC ......... *B01D 17/0214* (2013.01); *B01D 17/12* (2013.01); *C02F 1/40* (2013.01)

(58) Field of Classification Search
CPC ..... B01D 17/0214; C02F 1/40; C02F 2101/32
USPC .......... 210/800, 195.1, 257.1, 521, 522, 540
See application file for complete search history.

(56) References Cited

U.S. PATENT DOCUMENTS

| | | | | |
|---|---|---|---|---|
| 889,664 A | * | 6/1908 | Crozier | B01D 35/18 210/257.1 |
| 3,862,040 A | * | 1/1975 | Preus | B01D 17/0214 210/540 |
| 3,940,331 A | | 2/1976 | Rastatter | |
| 4,406,789 A | * | 9/1983 | Brignon | B01D 17/0214 210/519 |
| 4,597,874 A | * | 7/1986 | Francis, Jr. | B01D 17/0214 210/805 |

(Continued)

FOREIGN PATENT DOCUMENTS

| WO | 85/00851 A1 | 2/1985 |
| WO | 91/12893 A1 | 9/1991 |
| WO | 95/04702 A1 | 2/1995 |

OTHER PUBLICATIONS

PCT/EP2014/076408 International Search Report dated Feb. 24, 2015 (3 p.).

(Continued)

*Primary Examiner* — Christopher Upton
(74) *Attorney, Agent, or Firm* — Conley Rose, P.C.

(57) ABSTRACT

A system and method for extracting oil from a fluid mixture includes a separation vessel having an internal chamber that extends to a chamber elevation, an inlet port, a water outlet port, and an oil outlet port. A liquid storage tank has an inlet port, an upper outlet port located at an upper outlet elevation, and a lower outlet port. A first conduit system interconnects the separation vessel's water outlet port and the tank's inlet port and has a top conduit segment at the upper outlet elevation. A second conduit system interconnects the first conduit system and the tank's inlet port. The second conduit system intersects the first conduit system below the upper outlet elevation and above the chamber elevation. A pump may be employed to transfer fluid from the upper outlet port back to the separation vessel.

22 Claims, 2 Drawing Sheets

(56) References Cited

U.S. PATENT DOCUMENTS

| | | | |
|---|---|---|---|
| 5,147,534 A * | 9/1992 | Rymal, Jr. | B01D 17/0214 |
| | | | 210/521 |
| 7,166,230 B2 | 1/2007 | Nilsen et al. | |
| 7,927,490 B2 * | 4/2011 | Teichroeb | B01D 17/0214 |
| | | | 210/521 |
| 2013/0334142 A1 | 1/2013 | Janjua | |
| 2013/0098850 A1 | 4/2013 | Wolf | |
| 2016/0318043 A1 * | 11/2016 | Wolf | C02F 1/40 |

OTHER PUBLICATIONS

Office Action dated Jan. 11, 2018, for U.S. Appl. No. 15/105,094 (11 p.).
"Horizontal Gun Barrel Vessel;" National Oilwell Varco, Accessed Jan. 25, 2018 (https://www.nov.com/Segments/Completion_and_Production_Solutions/Process_and_Flow_Technologies/Production_Technologies/Separation/Horizontal_Gun_Barrel.aspx) (4 p.) no date.
Summary Sheet: "Horizontal Gun Barrel Vessel," National Oilwell Varco (1 p.) no date.
"Process and Flow Technologies Water Solutions," National Oilwell Varco (2016) (9 p.).

* cited by examiner

APPARATUS, SYSTEM, AND METHOD FOR SEPARATING OIL FROM A FLUID MIXTURE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Field of the Disclosure

This disclosure relates generally to separating oil from a mixture that contains oil and water. More particularly, it relates to an apparatus and system for separating oil from produced water from an oil well that contains a mixture of oil and water.

Background to the Disclosure

Oilfield wastewater and produced water are created in fracturing ("frac") flowback and/or in both land-based and offshore oil production operations. The wastewater and produced water are processed to extract oil as best as is possible. The wastewater or produced water is a fluid mixture that contains water and oil laden with residual solids. Water processing facilities commonly receive the fluid mixture either by pipeline or by truck. Conventional facilities are designed to receive the fluid mixture into an offload or de-sand tank. The fluid mixture is then pumped to a "vertical gun barrel" separation tank, then through a water leg which holds a constant level on the vertical gun barrel, and then into water storage tanks. Some of the oil remains and accumulates in the water storage tanks. This system is plagued with certain problems which include: build of solids in the storage tank, poor recovery of oil from the water, and difficulty in removing oil from the water storage tanks. Improvements have been achieved with a newer system that includes a "horizontal gun barrel" (HGB) separation tank, which has a longer flow path, but operations difficulties continue, including difficulty in removing oil from the water storage tanks. An apparatus or system that provides operational improvements would be useful to the oil field industry.

BRIEF SUMMARY OF THE DISCLOSURE

These and other needs in the art are addressed in one embodiment by a system for extracting oil from a fluid mixture that includes oil and water. In an embodiment, the system comprises a separation vessel having an internal chamber that extends upwardly to a chamber elevation, an inlet port, a water outlet port, and an oil outlet port; wherein, the oil outlet port is disposed at an elevation that is greater than the elevation of the water outlet port. In addition, the system includes a first liquid storage tank having an internal chamber extending to a tank elevation, an inlet port, an upper outlet port that is disposed at an upper outlet elevation, and a lower outlet port disposed below the upper outlet. Further, the system includes a first conduit system interconnecting the water outlet port of the separation vessel and the inlet port of the first liquid storage tank and comprising a top conduit segment that is positioned at an elevation equal to the upper outlet elevation of the upper outlet port in the first liquid storage tank. Still further, the system includes a second conduit system interconnecting the first conduit system and the inlet port of the first liquid storage tank, the second conduit system intersecting with the first conduit system at an elevation that is less than the upper outlet elevation and greater than the chamber elevation. The system also includes a pump in fluid communication with the upper outlet port of the first storage tank and configured to pump fluid exiting the upper outlet port to the inlet port of the separation vessel.

In another embodiment, a system for extracting oil from a fluid mixture that includes oil and water includes a separation vessel comprising: an internal chamber that extends upwardly to a chamber elevation, an inlet port, a water outlet port, and an oil outlet port; wherein, the oil outlet port is disposed at an elevation that is greater than the elevation of the water outlet port. In addition, the system includes a plurality of liquid storage tanks, each comprising: an inlet port, an upper outlet port that is disposed at an upper outlet elevation that is substantially the same for all tanks, a lower outlet port disposed below the upper outlet port, and an internal chamber extending to a tank elevation that is greater than the upper outlet elevation, the internal chamber in fluid communication with the inlet port, the upper outlet port, and lower outlet port. Further, the system includes a conduit system interconnecting the water outlet port of the separation vessel with the inlet ports of the liquid storage tanks to allow fluid communication there between, the conduit system comprising: a first conduit segment in fluid communication with the water outlet port of the separation vessel and extending upward, and a top conduit segment in fluid communication with the first conduit segment and with the inlet ports of the liquid storage tanks, the top conduit segment positioned at an elevation equal to the upper outlet elevation. Still further, the system includes a second conduit system interconnecting the first conduit segment and the inlet ports of the liquid storage tanks, the second conduit system intersecting the first conduit segment at an elevation that is less than the upper outlet elevation and greater than the chamber elevation. Moreover, the system includes a return conduit system interconnecting the upper outlet ports of the liquid storage tanks with the inlet port of the separation vessel for fluid communication.

In another embodiment, a system for extracting oil from a fluid mixture that includes oil and water includes a separation vessel comprising: an internal chamber having a vertical span that extends upwardly to a chamber elevation and having a horizontal span that is greater than its vertical span, an inlet port, a water outlet port separated horizontally from the inlet port by a distance greater than the vertical span of the internal chamber, and an oil outlet port; wherein, the oil outlet port is disposed at an elevation that is greater than the elevation of the water outlet port. In addition, the system includes a first liquid storage tank comprising: an inlet port, a lower outlet port, and an internal chamber extending to a tank elevation, the internal chamber in fluid communication with the inlet port and lower outlet port. Further, the system includes an oil storage tank comprising an oil inlet port disposed at an oil inlet elevation that is less than the tank elevation. Still further, the system includes a conduit system interconnecting the water outlet port of the separation vessel with the inlet port of the first liquid storage tank for fluid communication, the conduit system comprising: a first conduit segment in fluid communication with the water outlet port of the separation vessel and extending upward, and a top conduit segment in fluid communication with the first conduit segment and with the inlet port of the first liquid storage tank, the top conduit segment positioned at a top elevation greater than the oil inlet elevation. Moreover, the system includes a third conduit system interconnecting the oil outlet port of the separation vessel with the oil inlet port of the oil storage tank, the third conduit system including an air bleed valve disposed at an elevation above the chamber elevation.

These and other needs in the art are addressed in an embodiment by a method for extracting oil from a fluid mixture that includes oil and water. In an embodiment, the method comprises conveying the fluid mixture into a separation tank configured to separate the fluid mixture into an intermediate fluid including water and a lighter fluid including oil, distinguished by specific gravity. In addition, the method includes conveying a first portion of the intermediate fluid to a first storage tank through a first conduit system. Further, the method includes skimming oil from the first storage tank and conveying it back to the separation tank. Still further, the method includes conveying a second portion of the intermediate fluid to a second storage tank through a second conduit system that is in fluid communication with the first conduit system at an intersection and has a top segment disposed above the intersection.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed exemplary embodiments, reference will now be made to the accompanying drawings, wherein.

NOTATION AND NOMENCLATURE

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the terms "including" and "comprising," as well as derivations of these, are used in an open-ended fashion, and thus are to be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, then X may be based on Y and any number of other factors.

DETAILED DESCRIPTION OF THE DISCLOSED EXEMPLARY EMBODIMENTS

Figure 1:
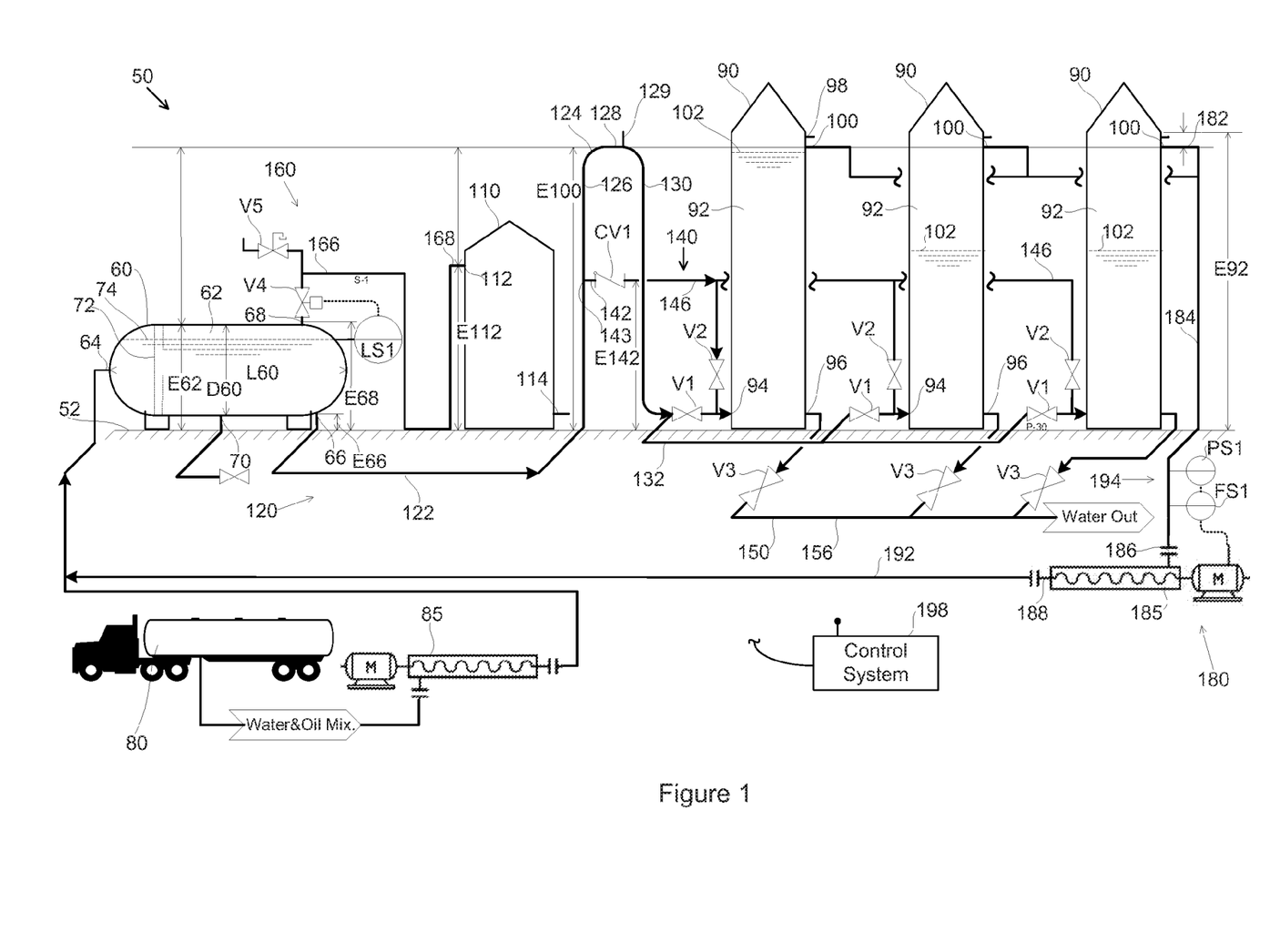
FIG. 1 shows an elevation view, in schematic form, of an embodiment of a system for extracting oil from a fluid mixture in accordance with principles described herein.

Referring to FIG. 1, in an exemplary embodiment, an oil-water separation system 50 is configured to extract oil from a fluid mixture containing oil and water. The fluid mixture may be wastewater or produced water from a land-based or an offshore oil production operation. System 50 includes a separation vessel 60, a plurality of liquid storage tanks 90, an oil storage tank 110, a plurality of conduit systems 120, 140, 150, 160, 180 and a control system 198. In FIG. 1, the several fluid containers and tanks are shown to be mounted at a common base elevation 52, which will be used as a datum plane for measuring the elevations of various components or features. Three storage tanks 90 are shown, but any practical number of storage tanks may be used, such as 2, 4, 10, 29, 50, etc., as may be feasible based on technical or economic considerations. Some other embodiments may have a single storage tank. In various embodiments, one or more of the several vessels and tanks 60, 90, 110 may be mounted on a different elevation, but the common base elevation 52 would continue to serve as a datum plane for measuring the disclosed and the claimed elevations. As used herein and in the claims, the elevation of component, such as a conduit (e.g. a piece of tubing or pipe), a tank, a vessel, or a chamber, refers to the portion of that component that is configured to contain a process fluid.

In this embodiment, the separation vessel 60 is generally cylindrical and has a nominal vessel length L60 extending horizontally and a nominal vessel diameter D60 extending vertically, making vessel 60 a horizontal cylinder. The horizontal span of vessel 60, i.e. length L60, is greater than its vertical span, i.e. diameter D60, providing shorter distance through which the oil must rise in order to separate from the water, as compared to certain previous separation vessels, such as a vertical gun barrel that is vertically elongate and therefore requires that the lighter fluid (e.g. oil) travel a greater distance before separating from the heavier fluid (e.g. water). Consequently, the horizontally elongate vessel 60 is configured to provide greater separation efficiency for a given dwell time within the vessel. Greater separation efficiency means that more of oil from the inlet flow is removed before the intermediate fluid (e.g. partially cleaned water) exits the vessel. Some embodiments of the current disclosure are even operated with a lower dwell time as compared to a vertically elongate separation vessel that may achieve the lower separation efficiency or, at most, a similar separation efficiency. Some embodiments of the disclosed system that have lower dwell time also have a higher throughput rate.

Vessel 60 may also be called a horizontal gun barrel (HGB). Vessel 60 includes an internal chamber 62 having a horizontal span and a vertical span that are equal to or approximately equal to the nominal length L60 and nominal diameter D60, respectively. Internal chamber 62 extends vertically up to a chamber elevation E62 above the base elevation 52. In an example, vessel length L60 is 30 feet, and vessel diameter D60 is 8 feet. Vessel 60 includes an inlet port 64 to receive a fluid mixture to be processed, a water outlet port 66 distal the inlet 64 and near the bottom of vessel 60, an oil outlet port 68 also distal the inlet 64 but near the top of vessel 60, a solids removal port 70 near the bottom of vessel 60, and a plurality of vertical baffles 72 located proximal the inlet port 64 to distribute the flow laterally and to encourage solids to drop to the bottom. The example of FIG. 1 includes two baffles 72. Vessel 60 may also include an automated or semi-automated solids removal system (not shown) to aid in the removal of solids through port 70. Water outlet port 66 is separated horizontally from the inlet port 64 by a distance greater than the vertical span of the internal chamber 62, i.e. a distance greater than the vertical span diameter of vessel 60. Oil outlet port 68 is located at an elevation E68 that is greater than the elevation E66 of water outlet port 66. In FIG. 1, the elevation E68 of Oil outlet port 68 is equal to or greater than the chamber elevation E62.

Typically, the fluid to be processed is a mixture that includes oil and water and may contain other fluids and particulate matter such as dirt, rock fragments, or sand. The water may be salt water, fresh water, brackish water, etc., as examples. The fluid mixture may come from a land-based oil well or from an off-shore oil well, as examples. In the example of FIG. 1, a mixture that includes oil and water is received from a tank truck 80 and is moved by a pump 85 through inlet port 64 into vessel 60. In at least one embodiment, pump 85 is a low-shear pump, configured to minimize the amount of blending or emulsification of oil and water that may occur when the fluid mixture passes through the pump. In at least one embodiment, pump 85 is a progressive cavity pump.

During normal operation, chamber 62 of vessel 60 is completely filed with fluid and an oil-water interface 74 develops therein. The baffles 72 and gravity separate the incoming fluid mixture in to an upper layer of lighter fluid, a lower portion of intermediate fluid, and solids that settle to the bottom. In typical operation, the lighter fluid is oil, and the intermediate fluid includes water and some residual oil or other contaminants and exits through the water outlet port 66.

Each liquid storage tank 90 includes an internal chamber 92 extending from the bottom of tank 90 vertically upward at least to a nominal tank height, which is located at a tank elevation E92, an inlet port 94 located proximal the bottom of chamber 92, a lower outlet port 96 located proximal the bottom of chamber 92, a vent port 98 located proximal the top of chamber 92, and an upper outlet port 100 located proximal the top of chamber 92 at an upper outlet elevation E100. Ports 94, 96, 98, 100 are in fluid communication with chamber 92. Elevation E100 is less than tank elevation E92, less than the elevation of vent port 98, and greater than the elevation of the lower outlet port 96. The elevations E100 of the upper ports 100 on all tanks 90 are the same or substantially the same. In the exemplary embodiment of FIG. 1, the bottom of tank 90 is at base elevation 52, tank elevation E92 is 25 feet; upper outlet elevation E100 is two feet less than tank elevation E92; the elevation of vent port 98 is 24.5 feet; tank 90 has a tank diameter of 12 feet; and lower outlet port 96 is horizontally separated from inlet port 94 by the tank diameter. Vent port 98 may be employed to bleed a gas, such as air, from the top of tank 90. Alternatively, vent port 98 may be employed as another liquid outlet port for oil. In some embodiments, the port 98 may be closed. In some embodiments, vent port 98 is located on the roof of tank 90.

Oil storage tank 110 includes an oil inlet port 112 and an outlet port 114. Inlet port 112 is located at an oil inlet elevation E112 that is less than the upper outlet elevation E100 of the upper ports 100 on liquid storage tanks 90.

An intermediate fluid conduit system 120 interconnects the water outlet port 66 of the separation vessel 60 with the inlet ports 94 of the storage tanks 90 to allow fluid communication of the intermediate fluid. Conduit system 120 has various conduit segments, including an initial segment 122, an inverted U-tube 124, and a completion segment 132. Inverted U-tube 124 includes an upward segment 126 extending upward, a top segment 128 that achieves a top elevation equal to upper outlet elevation E100 of tanks 90, a vent port 129 rising above top segment 128, and a downward segment 130 extending down toward the elevations of tank inlet ports 94. U-tube 124 may also be called a U-leg 124. Completion segment 132 has multiple terminating portions, each with a tank inlet valve V1 and each extending to one of the tank inlet ports 94. Thus each tank inlet port 94 is serviced by a dedicated inlet valve V1 to allow or inhibit fluid communication, selectively, between (at least) downward segment 130 of inverted U-tube 124 and the corresponding tank 90. Each inlet valve V1 is configured at least for an open position and a closed position. Gate valves, ball valves, and butterfly valves may all serve as inlet valves 135, as examples. In various embodiments, inlet valves V1 may be configured for manual or for powered operation and may be controlled locally or via remote control. Valve V1 may also be configured both for manual operation and for powered operation, as may be selected by an operator. Vent port 129 on U-leg 124 is vented to atmosphere, but in some embodiments, vent port 129 is plumbed to communicate fluidly with the top of a tank 90, above the liquid level in that tank, and communicates with the tank's vent port 98.

As used herein, including the claims, the term "conduit segment" means and includes any number of conduit segments or runs that are in fluid communication with one another and that cooperate to convey fluid from one point to another. As examples, a claim may use the term "first conduit segment" to refer to a conduit run that includes initial segment 122 and upward segment 126, or the term may refer to initial segment 122 or upward segment 126 alone.

Still referencing FIG. 1, a by-pass conduit system 140 interconnects the upward segment 126 of inverted U-tube 124 with the inlet ports 94 of the storage tanks 90 to provide fluid communication, by-passing the top segment 128 and the downward segment 130. By-pass conduit system 140 is configured to provide a flow of the intermediate fluid from vessel 60 in order to push-out or skim the oil that collects at the top of storage tanks 90 during normal operation. Thus, conduit system 140 can be used as a clean-out system. Conduit system 140 has multiple conduit segments, including an initial segment 142 that extends from the U-tube upward segment 126 at an intersection 143, a check valve CV1 coupled to initial segment 142, and a completion segment 146 extending downward toward the elevations of tank inlet ports 94.

Completion segment 146 has multiple terminating portions, each with a by-pass valve V2 and each coupling to one of the tank inlet ports 94. Thus each tank inlet port 94 is serviced by a dedicated valve V2 to allow or inhibit fluid communication, selectively, between by-pass conduit system 140 and the corresponding tank 90. Each by-pass valve V2 is configured like any of the options described for inlet valves V1 and may also be called an inlet valve V2. Check valve CV1 is oriented to allow fluid to travel only from the upward segment 126 to completion segment 146 and to inhibit fluid flow in the reverse direction. A portion of completion segment 146 that is located beyond inlet valve V2 and a portion of completion segment 132 that is located beyond inlet valve V1 intersect each other in order to couple to tank inlet port 94. In other embodiments, each tank 90 includes two inlet ports 94, one for each completion segment 132, 146.

Initial segment 142 of by-pass conduit system 140 intersects upward segment 126 at a by-pass elevation E142 that is below top segment 128 of the inverted U-tube 124. Thus, by-pass elevation E142 is less than the upper outlet elevation E100 of the upper outlet ports 100 of the storage tanks 94. In at least one embodiment, the by-pass elevation E142 is greater than the chamber elevation E62 of separation vessel 60. Each component 142, CV1, 146, V2 of the by-pass conduit system 140 includes a flow passage that cooperates in providing fluid communication between upward segment 126 and the tanks 90. The internal flow passages of the by-pass conduit system 140 are located below the elevation E100; however, in some embodiments a portion of system 140 located beyond the intersection 143 may rise above and drop below the upper outlet ports 100 before reaching tank inlet 94.

A cleaned water discharge conduit system 150 includes an outlet valve V3 at each lower outlet port 96 of each tank 90 and includes a piping manifold 156 to connect the outlet valves V3 to a common discharge pipe. Conduit system 150 is provided to remove and transport the cleaned water that accumulates at the bottom storage tanks 90. The cleaned water may contain contaminants and even some oil.

Continuing to reference FIG. 1, an oil conduit system 160 interconnects the oil outlet port 68 of the separation vessel 60 with the oil inlet port 112 of the oil storage tank 110 to provide fluid communication there between. Conduit system 160 includes multiple conduit segments and components, including a control valve V4 coupled to outlet port 68, a level sensor LS1 coupled to vessel 60 and electrically coupled to valve V4. Conduit system 160 includes an initial segment 166 extending from control valve V4 opposite the port 68, and a completion segment 168 extending to oil inlet port 112. Conduit system 160 also includes an air bleed valve V5 coupled at the highest location along initial segment 166. In the example of FIG. 1, initial segment 166 includes portions (i.e. smaller segments) that rise above vessel 60, extend parallel to base 52, drop down to base 52, and rise up toward the elevation E112 of oil inlet port 112 to couple to completion segment 168. In at least one embodiment, initial segment 166 rises above vessel 60 and extends horizontally toward oil inlet port 112 without dropping toward base 52. In at least one embodiment, conduit system 160 is located entirely below the elevation E100 of the upper ports 100.

Level sensor LS1 is configured to monitor the oil-water interface 74 within vessel 60 and to open valve V4 when interface 74 moves to a location below a selected, target elevation, allowing excess oil at the top of vessel 60 to exit through oil conduit system 160 and travel to oil storage tank 110. In various embodiments, level sensor LS1 is a level switch configured to produce a binary response. In other embodiments, sensor LS1 may be a level transducer configured to transmit measurement data. During normal operation, the vessel chamber 62 and the portion of conduit system 120 from water outlet port 66 up to the top segment 128 remain filled with fluid, up to the upper outlet elevation E100. Of course, in some conditions, an air pocket may develop in vessel 64 or conduit system 120. Thus filled with fluid, the upward segment 126 of U-tube 124 exerts a hydrostatic pressure head on the fluid in vessel chamber 62, and provides a motive force for pushing oil through conduit system 160 and into tank 110 when valve V4 is opened. The amount of pressure head available is equal to the difference in elevation between upper outlet elevation E100 and the elevation E112 of oil inlet port 112.

A return conduit system 180 interconnects the upper outlet ports 100 of the storage tanks 90 with the inlet port 64 of the separation vessel 60 to provide fluid communication there between. Conduit system 180 includes various conduit segments and components, including an initial segment 182 having portions coupled to each of the upper outlet ports 100, a downward segment 184 extending toward base elevation 52 and coupled to the suction port 186 of a transfer pump 185, and a completion segment 192 extending between the pump's discharge port 188 and inlet port 64. The various conduit segments 182, 184, 192 may also be called return segments. Conduit system 180 further includes a fluid sensor 194 coupled to downward segment 184, located below the upper outlet ports 100, proximal base elevation 52 and pump 185. Fluid sensor 194 is positioned and coupled to sense the presence and the absence of a fluid, for example oil, in at least a portion of downward segment 184 and to send a signal to activate or to deactivate transfer pump 185 as appropriate. In the example of FIG. 1, fluid sensor 194 comprises a pair of sensors: a pressure sensor PS1 and a flow sensor FS1. In various embodiments, pressure sensor PS1 is a pressure switch configured to produce a binary response. Alternatively, switch PS1 is a pressure transducer configured to transmit measurement data. Similarly, in various embodiments, flow sensor FS1 is a flow switch configured to produce a binary response or is a flow rate transducer configured to transmit measurement data. Pump 185 is configured to activate and pump fluid when the pressure sensor PS1 detects that the pressure head of a fluid in the downward segment 184 is greater than a predetermined threshold pressure value, indicating a quantity of fluid in segment 184. As examples, the predetermined threshold pressure value may correspond to the pressure head that results when downward segment 184 is full of oil up to the elevation E100 or is half full or two-thirds full of oil. The pump is configured to deactivate and cease pumping fluid when the flow sensor FS1 senses a flow rate in the downward segment 184 that is less than a threshold flow rate value. In at least one embodiment, pump 185 is a low-shear pump, configured to minimize the amount of blending or emulsification of oil and water that may occur when such a fluid mixture passes through the pump. In at least one embodiment, pump 185 is a progressive cavity pump. The statement that pump 185 is configured to activate or to deactivate based on a sensor PS1, FS1 means that circuitry and logic in pump 185, in a sensor PS1, FS1, or in control system 198 monitors the sensors PS1, FS1 and causes pump 185 to turn-on or turn-off at an appropriate time.

Referring still to FIG. 1, control system 198 is configured to monitor or regulate the pumps, the sensors, and the valves of oil-water separation system 50 and to provide an operator with information and with control features. Control system 198 communicates with the pumps, the sensors, and the valves through wired connections, through wireless connections, or a combination of wired and wireless connections.

The amount of monitoring and regulating performed by control system 198 varies with different embodiments of system 50. In various embodiments, the purging of oil from the top of a tank 94 is automatically actuated by control system 198 through the sequencing of inlet valve V1, by-pass valve V2, outlet valve V3, and transfer pump 185. The operation of pump 185 is based on signals or data received from pressure sensor PS1 and flow sensor FS1. In various embodiments, the purging of oil from the top of separation vessel 60 is automatically actuated by control system 198 through interactions between level sensor LS1 and control valve V4.

During a normal mode of operation of oil-water separation system 50, a fluid mixture that includes oil and water enters separation vessel 60 through inlet port 64 and fills chamber 62. A first portion of the oil rises to the top, and the intermediate fluid remains toward the bottom of chamber 62, generating the oil-water interface 74. The flow of the fluid mixture into vessel 60 may be driven by pump 85 or by gravity. The first portion of oil is removed to tank 110 by oil conduit system 160 as explained above. The intermediate fluid flows through outlet port 66 and through the inverted U-tube 124 of conduit system 120. Typically, this intermediate fluid contains some residual oil. During operation, the inlet valve V1 and outlet valve V3 are open for at least a first water storage tank 90, and corresponding by-pass valve V2 remains closed for the same water storage tank 90. With inlet valve V1 open, some or all the intermediate fluid enters a first tank 90, with any remainder going to another tank 90 if another valve V1 is open, and the fluid in the first tank rises or remains steady at some level below the upper outlet port 100. The term "normal-flow configuration" for any particular tank 90 will refer to the configuration in which the inlet valve V1 and the outlet valve V3 are open and the by-pass valve V2 is closed for that tank 90. Continuing to discuss the operation of the first tank 90, over time, some or all residual oil separates from the water in the first tank 90. The residual oil rises and accumulates in a layer above the water, creating an oil-water interface 102 in tank 90. The water that settles below interface 102 will also be called "cleaned water;" although it may continue to contain some of the oil or other contaminants of the intermediate fluid that entered inlet port 94. At planned intervals, or at another selected time, the oil in the first tank 90 is removed through upper outlet port 100 by closing the tank's inlet valve V1 and outlet valve V3 and opening the by-pass valve V2, causing the fluid level in first tank 90 to rise to the upper outlet elevation E100. This removal of oil from the top of a tank 90 will also be called "skimming" and may be initiated by an operator or by pre-established programming in control system 198, using a time criterion. During typical skimming, additional fluid mixture continues to enter vessel 60 from pump 85 or another source, and the intermediate fluid continues to exit through the vessel outlet 66.

Once initiated, the skimming of oil from the top surface of fluid in the first tank 90 (or any selected tank 90) may be performed without supervision by an operator and without supervision by control system 198 by maintaining an inlet valve V1 on at least one other tank 90 open. While the fluid mixture flows into vessel 60, some of the intermediate fluid (water and its residual oil or other contaminants) from vessel 60 flows to the other tank or tanks 90. To skim the first tank 90 without supervision, its outlet valve V3 is closed as mentioned above, its inlet valve V1 is closed, and its by-pass valve V2 is opened; this is the skimming configuration for the first tank. In this configuration, some intermediate fluid from vessel 60 enters the first tank 90 via the by-pass conduit system 140. This intermediate fluid) fills the first tank 90 up the upper outlet port 100. The pressure of the fluid head that exists in the inverted U-tube 124 between the intersection 143 and in the top segment 128 governs the flow of the intermediate fluid through the open by-pass valve V2 and governs the steady-state elevation of the oil-water interface 102 in the first tank 90 and the release of oil through upper outlet port 100, as will be explained next.

Typically, water, exclusive of any oil, has a specific gravity of 1.0 or greater. The water may be saltwater or "fresh water," as examples. The oil at the top of vessel 60 and at the top of tank 90 has a lower specific gravity, for example, a specific gravity of about 0.7. This difference causes the cleaned water and the residual oil in first tank 90 (and in the other tanks 90) to separate and form the oil-water interface 102. Separation is also aided by the polar and non-polar molecular difference between water and oil. The intermediate fluid in the inverted U-tube 124, including the top segment 128 includes water and a small fraction of oil and, has a specific gravity that is equal or nearly equal to the specific gravity of the cleaned water in the tanks 90 and is greater than the specific gravity of oil. The fluid head in the inverted U-tube 124, including top segment 128, drives the oil-water interface 102 upward, causing the less dense oil layer in the first tank 90 to rise above the upper outlet elevations E100 and exit through upper outlet port 100. This rise of oil-water interface 102 continues until it reaches an elevation equal to or somewhat below the top segment 128. The pressure head of the intermediate fluid in top segment 128 is able to drive oil through upper outlet port 100, but when the level of the cleaned water reaches the upper outlet elevation E100 the water in tank 90 balances with the level of water in top segment 128, reducing or stopping the flow of fluid through upper outlet port 100. In this manner, the skimming from the first tank 90 may continue indefinitely. The first tank can remain in the skimming configuration indefinitely, without supervision, while fluid continues to enter vessel 60, and intermediate fluid passes through the intermediate fluid conduit system 120. At least some of intermediate fluid from separation vessel 60 continues to pass to the one or more other tank 90, or the flow from vessel 60 may stop or restart, as may occur if inlet pump 85 is deactivated and later reactivated. In at least some situations, when the height of oil-water interface 102 in the first tank 90 rises to the location where it balances with the height of the intermediate fluid in the U-tube, intermediate fluid stops entering inlet port 94 and fluid (e.g. oil) stops exiting through upper port 100. As a result, flow sensor FS1 detects a cessation or reduction of fluid flow in downward segment 184 of return conduit system 180, and transfer pump 185 is deactivated. With no intermediate fluid entering first tank 90, all the flow of intermediate fluid passes to the other tank or tanks 94 having an open inlet valve V1. After a selected time period, the first tank 90 may be returned to the normal-flow configuration in which its valves V1, V3 are open and by-pass valve V2 is closed. Optionally, in a supervised mode of operation, first tank 90 may be returned to the normal-flow configuration after flow sensor FS1 detects a cessation of oil flow in downward segment 184. In some other embodiments, the activation of pump 185 may be based on a rising signal from flow sensor FS1, and the deactivation of pump 185 may be based on a falling signal from pressure sensor PS1. Skimming of the same first tank 90 may be repeated at a later time.

In some embodiments, during a single session of skimming before first tank 90 is returned to the normal-flow configuration, pump 185 may be reactivated to pump oil after being deactivated if the pressure sensor PS1 again detects a sufficient pressure head of a fluid, i.e. oil or water, in the downward segment 184.

Any of the storage tanks 90 can be skimmed periodically with or without supervision while at least one other tank 90 is in the normal-flow configuration, configured to receive intermediate fluid through its inlet valve V1. Depending on the flow rate of fluid mixture into vessel 60 and the flow rate of intermediate fluid leaving vessel 60, it may be appropriate to keep a plurality of tanks 90 in the normal-flow configuration while skimming a tank. When multiple tanks 90 are in normal-flow configuration, they are in fluid communication through completion segment 132 of conduit system 120, and the oil-water interfaces 102 or a fluid level in the communicating tanks 90 may become balanced, possibly achieving a common elevation, depending on the ratio of water and oil in each tank 90. Optionally, a plurality of storage tanks 90 can be skimmed simultaneously while at least one other tank 90 is in the normal-flow configuration.

In various embodiments or instances of this operational sequence, the timing and operation of the valves and pumps may be controlled by control system 198, using pre-established criteria or programming. Alternately, the timing and operation of the valves and pumps may be directly controlled by an operator through control system 198 or by manually manipulating the valves, when system 50 is equipped for manual operation. Optionally, the operation of the valves and pumps may be shared between the operator and control system 198.

As described above, for at least some embodiments, the skimming of oil from the top of a tank 90 continues without supervision. "Without supervision" means that the decision to change a tank 90 from the normal-flow configuration to the skimming configuration or vice versa is achieved based on a time criterion or another criterion unrelated to the amount of oil in the tank 90 or unrelated to the amount of oil leaving port 100. Unsupervised skimming of oil from the top of a tank 90 is accomplished without using a level indicating device. In FIG. 1, tanks 90 are configured without a level sensor. Unsupervised skimming is possible based on the balancing effect that occurs as a result of these three factors: (1) the top of U-tube 124 being filled with intermediate fluid and having the same elevation as the upper outlet port 100 of tank 90, (2) the presence of oil-water interface 102 in tank 90, and (3) of the different specific gravities (or densities) of the oil above the interface 102 and the cleaned water below the interface 102.

Alternatively, the skimming process may be supervised; meaning that the decision to change a tank 90 from the normal-flow configuration to the skimming configuration or vice versa is governed based on process parameters rather than based solely on a time period or arbitrary decision. Supervised operation of the skimming process may utilize knowledge of one or more of these process parameters: the location of the of the oil-water interface 102, the location of the top of the oil layer in the tank 90, or the amount of oil in the tank 90, as might be achieved by the use of level indicating device, such as a dip stick, an electrically coupled level sensor, or another technology known in the art. For some embodiments or some operation scenarios, supervision of the skimming process can be achieved using the signals of pressure sensor PS1 or flow sensor FS1.

Some of these embodiments include a level sensor or another technology coupled to the tank 90 to detect and indicate the location of the oil-water interface 102 or the amount of oil in the tank 90, and some of these embodiments operate the skimming process in a supervised mode based on a response signal from the level sensor. Even so, one or more of these embodiments having a level sensor may perform the skimming process without supervision, that is to say, without responding to the information from the level sensor. Even so, the information from the level sensor may be collected for evaluation of the effectiveness of the skimming process or for another purpose. Various embodiments include a dip stick on a tank 90, while others do not.

Figure 2:
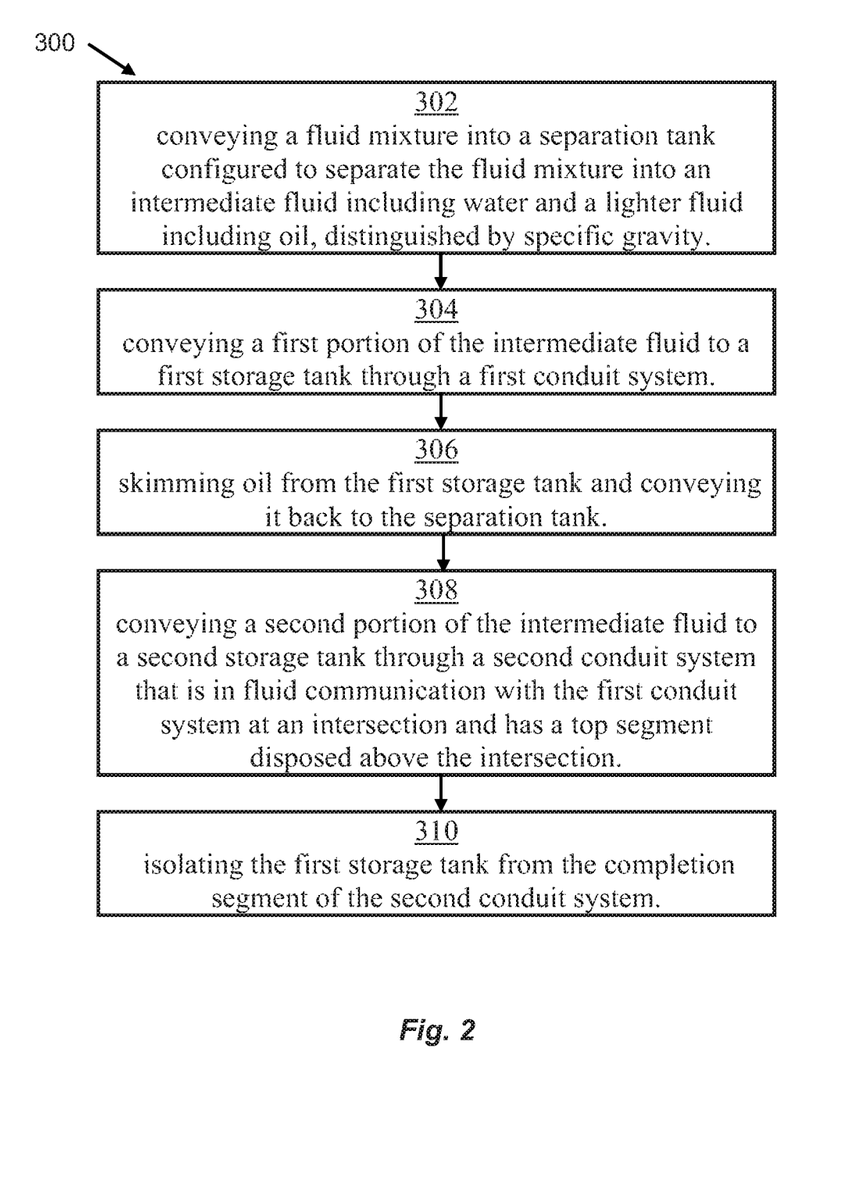
FIG. 2 shows a diagram of a method for extracting oil from a fluid mixture in accordance with principles described herein.

FIG. 2 shows a method 300 for extracting oil from a fluid mixture that includes oil and water in accordance with the principles described herein. At block 302, method 300 includes conveying a fluid mixture into a separation tank configured to separate the fluid mixture into an intermediate fluid including water and a lighter fluid including oil, distinguished by specific gravity. Block 304 includes conveying a first portion of the intermediate fluid to a first storage tank through a first conduit system. Block 306 includes skimming oil from the first storage tank and conveying it back to the separation tank. Block 308 includes conveying a second portion of the intermediate fluid to a second storage tank through a second conduit system that is in fluid communication with the first conduit system at an intersection and has a top segment disposed above the intersection. Block 310 includes isolating the first storage tank from a completion segment of the second conduit system. In some embodiments of method 300, skimming oil is performed free of level detection in the first storage tank. Various actions of method 300 may be performed by control system 198. Various embodiments of method 300 may include fewer operations than described, and other embodiments of method 300 include additional operations based on the concepts disclose herein.

While various vessels and tanks have been described as cylinders, in some embodiments, a vessel or tank or corresponding internal chamber may instead have another cross-sectional shape: such as a square, a rectangle, a hexagon, another type of polygon as examples, or a vessel or tank may be spherical as another example. While separation vessel 60 in the example of FIG. 1 is oriented horizontally, some embodiments have a separation vessel that is oriented differently, such as vertically. In an example, a vertically oriented, cylindrical separation vessel may be called a vertical gun barrel (VGB). Some embodiments include a separation vessel having a diameter that is greater than or equal to its length. In some embodiments, the water outlet port 66 is separated horizontally from the inlet port 64 by a distance less than or equal to the vertical span of the internal chamber 62 of the vessel.

Referring again to FIG. 1, although the inlet port 94 of each tank 90 is shown to be proximal the bottom of chamber 92, in other embodiments, one or more tanks 90 may include an inlet port 94 that is positioned at another elevation that is less than upper outlet elevation E100. For example, the inlet port 94 may be located any vertical location below elevation E142.

Referring again to FIG. 1, in some embodiments, at least one tank 90 has a tank elevation E92 or a tank diameter that varies from another of the tanks 90. However, all tank elevations E92 will be greater than the common elevation E100 shared by each upper outlet port 100 of all the tanks 90.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily mean that the particular step or operation is necessary to the method. If feasible, the steps or operations of a method may be performed in any order, except for those particular steps or operations, if any, for which a sequence is expressly stated. In some implementations, when feasible, two or more of the method steps or operations may be performed in parallel, rather than serially.

What is claimed is:

1. A system for extracting oil from a fluid mixture that includes oil and water, the system comprising:
a separation vessel comprising:
an internal chamber that extends upwardly to a chamber elevation;
an inlet port;
a water outlet port; and
an oil outlet port;
wherein the oil outlet port is disposed at an elevation that is greater than the elevation of the water outlet port;
a first liquid storage tank comprising:
an internal chamber extending to a tank elevation;
an inlet port;
an upper outlet port that is disposed at an upper outlet elevation; and
a lower outlet port disposed below the upper outlet;
a first conduit system interconnecting the water outlet port of the separation vessel and the inlet port of the first liquid storage tank and comprising a top conduit segment that is positioned at an elevation equal to the upper outlet elevation;
a second conduit system interconnecting the first conduit system and the inlet port of the first liquid storage tank, the second conduit system intersecting with the first conduit system at an elevation that is less than the upper outlet elevation and greater than the chamber elevation; and
a pump in fluid communication with the upper outlet port of the first storage tank and configured to pump fluid exiting the upper outlet port to the inlet port of the separation vessel.

2. The system of claim 1 wherein the first conduit system further comprises a U-tube;
wherein the U-tube comprises an upward conduit segment, the top conduit segment, and a downward conduit segment;
wherein the upward conduit segment is coupled between the water outlet port of the separation vessel and the top conduit segment;
wherein the downward conduit segment is coupled between the top conduit segment and the inlet ports of the first liquid storage tanks; and
wherein the second conduit system intersects the upward conduit segment.

3. The apparatus of claim 2 further comprising a plurality of liquid storage tanks, including the first liquid storage tank, wherein for each liquid storage tank:
the first conduit system interconnects the water outlet port of the separation vessel and the inlet port of the liquid storage tank;
the second conduit system interconnects the upward conduit segment and the inlet port of the liquid storage tank; and
the pump is in fluid communication with the upper outlet port of the liquid storage tank.

4. The apparatus of claim 1 further comprising:
an oil storage tank comprising an oil inlet port disposed at an elevation that is less than the upper outlet elevation; and
a third conduit system interconnecting the oil outlet port of the separation vessel with the oil inlet port of the oil storage tank.

5. The apparatus of claim 1 wherein the inlet port of the first liquid storage tank is located below the upper outlet port; and
wherein upper outlet elevation of upper outlet port is less than the tank elevation.

6. A system for extracting oil from a fluid mixture that includes oil and water, the system comprising:
a separation vessel comprising:
an internal chamber that extends upwardly to a chamber elevation;
an inlet port;
a water outlet port; and
an oil outlet port;
wherein the oil outlet port is disposed at an elevation that is greater than the elevation of the water outlet port;
a plurality of liquid storage tanks, each comprising:
an inlet port;
an upper outlet port that is disposed at an upper outlet elevation that is substantially the same for all tanks;
a lower outlet port disposed below the upper outlet port; and
an internal chamber extending to a tank elevation that is greater than the upper outlet elevation, the internal chamber in fluid communication with the inlet port, the upper outlet port, and lower outlet port;
a conduit system interconnecting the water outlet port of the separation vessel with the inlet ports of the liquid storage tanks to allow fluid communication there between, the conduit system comprising:
a first conduit segment in fluid communication with the water outlet port of the separation vessel and extending upward; and
a top conduit segment in fluid communication with the first conduit segment and with the inlet ports of the liquid storage tanks, the top conduit segment positioned at an elevation equal to the upper outlet elevation; and
a second conduit system interconnecting the first conduit segment and the inlet ports of the liquid storage tanks, the second conduit system intersecting the first conduit segment at an elevation that is less than the upper outlet elevation and greater than the chamber elevation;
a return conduit system interconnecting the upper outlet ports of the liquid storage tanks with the inlet port of the separation vessel for fluid communication.

7. The system of claim 6 wherein each liquid storage tank further comprises:
a first valve coupled between the inlet port and the top conduit segment;
a second valve coupled between the inlet port and the second conduit systems;
and third valve coupled to the lower outlet port.

8. The system of claim 7 wherein liquid storage tanks are free of any level sensor configured to send a signal to govern the operation of the first, second, and third valves.

9. The system of claim 6 wherein the return conduit system comprises:
a pump having a suction port and a discharge port;
a first return segment extending downward, the first return segment in fluid communication with the outlet ports of the liquid storage tanks and with the suction port; and
a second return segment in fluid communication between the discharge port of the pump and the inlet port of the separation vessel;
a fluid sensor positioned to sense the presence and the absence of a fluid in the first return segment;
wherein the fluid sensor and the suction port are disposed at an elevation less than the upper outlet elevation of the upper outlet ports.

10. The system of claim 9 wherein the fluid sensor comprises a pressure sensor and a flow sensor;
wherein the pump is configured to turn-on when the pressure sensor detects pressure in the first return segment greater than a threshold pressure value; and
wherein the pump is configured to turn-off when the flow sensor senses a flow rate in the first return segment less than a threshold flow rate value.

11. The system of claim 9 wherein the pump is a progressive cavity pump.

12. The system of claim 6 further comprising:
an oil storage tank comprising an oil inlet port disposed at an elevation that is less than the upper outlet elevation of the upper outlet ports; and
a third conduit system interconnecting the oil outlet port of the separation vessel with the oil inlet port of the oil storage tank.

13. The system of claim 6 further comprising a U-tube;
wherein the U-tube comprises the upward extending first conduit segment, the top conduit segment, and a downward conduit segment;
wherein the first conduit segment is coupled between the water outlet port of the separation vessel and the top conduit segment; and
wherein the downward conduit segment is coupled between the top conduit segment and the inlet ports of the liquid storage tanks.

14. A system for extracting oil from a fluid mixture that includes oil and water, the system comprising:
a separation vessel comprising:
an internal chamber having a vertical span that extends upwardly to a chamber elevation and having a horizontal span that is greater than its vertical span;
an inlet port;
a water outlet port separated horizontally from the inlet port by a distance greater than the vertical span of the internal chamber; and
an oil outlet port;
wherein the oil outlet port is disposed at an elevation that is greater than the elevation of the water outlet port;
a first liquid storage tank comprising:
an inlet port;
a lower outlet port; and
an internal chamber extending to a tank elevation, the internal chamber in fluid communication with the inlet port and lower outlet port;
an oil storage tank comprising an oil inlet port disposed at an oil inlet elevation that is less than the tank elevation;
a conduit system interconnecting the water outlet port of the separation vessel with the inlet port of the first liquid storage tank for fluid communication, the conduit system comprising:
a first conduit segment in fluid communication with the water outlet port of the separation vessel and extending upward; and
a top conduit segment in fluid communication with the first conduit segment and with the inlet port of the first liquid storage tank, the top conduit segment positioned at a top elevation greater than the oil inlet elevation; and
a third conduit system interconnecting the oil outlet port of the separation vessel with the oil inlet port of the oil storage tank, the third conduit system including an air bleed valve disposed at an elevation above the chamber elevation.

15. The system of claim 14 wherein the first tank further comprises an upper outlet port in fluid communication with the internal chamber and disposed at an upper outlet elevation equal to the top elevation of the top conduit segment; and
wherein the system further comprises a return conduit system interconnecting the upper outlet port of the first liquid storage tank with the inlet port of the separation vessel for fluid communication;
wherein the conduit system further comprises a second conduit segment in fluid communication with the first conduit segment and with the inlet port of the first liquid storage tank, the second conduit segment intersecting the first conduit segment at an elevation that is less than the upper outlet elevation and greater than the chamber elevation.

16. The system of claim 15 further comprising a plurality of liquid storage tanks, including the first liquid storage tank, wherein for each liquid storage tank:
the first conduit system interconnects the water outlet port of the separation vessel and the inlet port of the liquid storage tank;
the second conduit system interconnects the upward conduit segment and the inlet port of the liquid storage tank; and
the pump is in fluid communication with the upper outlet port of the liquid storage tank.

17. The system of claim 14 further comprising a low-shear pump coupled to the inlet port of the separation tank for fluid communication.

18. A method for extracting oil from a fluid mixture that includes oil and water, the method comprising:
conveying the fluid mixture into a separation tank configured to separate the fluid mixture into an intermediate fluid including water and a lighter fluid including oil, distinguished by specific gravity;
conveying a first portion of the intermediate fluid to a first storage tank through a first conduit system;
skimming oil from the first storage tank and conveying it back to the separation tank; and
conveying a second portion of the intermediate fluid to a second storage tank through a second conduit system that is in fluid communication with the first conduit system at an intersection and has a top segment disposed above the intersection.

19. The method of claim 18 wherein the top segment disposed above the first conduit system.

20. The method of claim 19 wherein skimming oil is performed free of level detection in the first storage tank.

21. The method of claim 18 wherein the intersection is upstream of the top segment.

22. The method of claim 21 wherein the second conduit system includes a completion segment located downstream of the top segment and leading to the first storage tank and to the second storage tank;
   wherein the method further comprises: isolating the first storage tank from the completion segment of the second conduit system.

* * * * *